(12) United States Patent
Shin et al.

(10) Patent No.: US 7,237,111 B2
(45) Date of Patent: Jun. 26, 2007

(54) METHOD OF AUTHENTICATING A CHANNEL AUTHORIZATION USING A NETWORK ACCESS DEVICE IN A COMBINED BROADCASTING AND COMMUNICATION SYSTEM

(75) Inventors: Kug Shin, Seoul (KR); Young-Seok Kim, Songnam-shi (KR)

(73) Assignee: Samsung Electronics Co, Ltd., Suwon-Si, Gyeonggi-Do (KR)

( * ) Notice: Subject to any disclaimer, the term of this patent is extended or adjusted under 35 U.S.C. 154(b) by 788 days.

(21) Appl. No.: 10/685,130

(22) Filed: Oct. 14, 2003

(65) Prior Publication Data

US 2004/0255118 A1 Dec. 16, 2004

(30) Foreign Application Priority Data

May 20, 2003 (KR) ............... 10-2003-0031973

(51) Int. Cl.
*G06F 1/24* (2006.01)
(52) U.S. Cl. ............... 713/168; 713/151; 713/193
(58) Field of Classification Search .............. 713/168, 713/151, 193
See application file for complete search history.

(56) References Cited

U.S. PATENT DOCUMENTS 5,719,560 A * 2/1998 Watkins .............. 340/5.5
5,991,409 A * 11/1999 Windel et al. .......... 705/62
6,565,000 B2 * 5/2003 Sehr .................. 235/384

* cited by examiner

*Primary Examiner*—Thomas R. Peeso
(74) *Attorney, Agent, or Firm*—Cha & Reiter, LLC

(57) ABSTRACT

A method of authenticating a channel authorization using a NAD (Network Access Device) in a combined broadcasting and communication system is provided. The method can process an authorization of a user independently from an AAA (Authentication, Authorization and Accounting) server. The system includes a plurality of STBs (Set Top Boxes) for receiving a broadcasting, an OLT (Optical Line Terminal)/ONU (Optical Network Unit) for transferring a broadcasting stream to the STBs, and the AAA server for a channel authentication. In operation, the NAD determines whether to switch the broadcasting stream to the STBs in the ONU, and the NAD is initialized by receiving and storing authentication information of the channel authorization from the AAA server when booting the NAD. Next, the NAD performs an authentication using the stored authentication information of the channel authorization in accordance with a channel request from the STB and then switches the requested channel when approved. The authentication information is updated and stored in accordance with an update signal of the authentication information of the channel authorization from the AAA server.

8 Claims, 5 Drawing Sheets

METHOD OF AUTHENTICATING A CHANNEL AUTHORIZATION USING A NETWORK ACCESS DEVICE IN A COMBINED BROADCASTING AND COMMUNICATION SYSTEM

CLAIM OF PRIORITY

This application claims priority to an application entitled "Method of authenticating a channel authorization using a NAD(Network Access Device) in a combined broadcasting and communication system," filed in the Korean Intellectual Property Office on May 20, 2003 and assigned Ser. No. 2003-31973, the contents of which are hereby incorporated by reference.

BACKGROUND OF THE INVENTION

1. Field of the Invention

The present invention relates to a combined broadcasting and communication system, and more particularly to a method of authenticating a channel authorization of a user during the combined service mode.

2. Description of the Related Art

FIG. 1 is a block diagram illustrating a general optical transmission network which provides a broadcasting service as well as a communication service. Referring to FIG. 1, a broadcasting service provider and a communication service provider transmit corresponding services to an OLT (Optical Line Terminal) 20. An optical cable is connected between the OLT 20 and an ONU (Optical Network Unit) 30 to exchange signals, such that when the corresponding service is provided from the ONU 30 to the user, the broadcasting service and the communication service can be transmitted separately. A set top box (STB) is commonly used for the transmission of the broadcasting service. The broadcasting service may be transmitted using an HFC (Hybrid Fiber Coaxial) cable network, a wireless network, or an optical cable such as FTTH.

When providing the broadcasting service, it is necessary to authenticate the user's authorization to access the broadcasting service and to perform the related accounting. To this end, an AAA (Authentication, Authorization and Accounting) server 10 is typically employed. The AAA server 10 provides authentication, authorization and accounting functions as the user tries to access computer resources.

FIGS. 2a and 2b are flowcharts illustrating the examples of a related art authentication process used in the broadcasting service.

Generally, in order to obtain an authorization for a channel desired by the user, private information is exchanged between the user's STB 40, the ONU 30 used for switching broadcasting stream to the user, and the AAA server 10. To receive a broadcasting service, the user activates the STB 40 to request a channel to the ONU 40, and in response, the ONU 30 requests the authorization to the AAA server 10, or the user's STB 40 requests the authorization to the AAA server 10 directly and then requests the desired channel to the ONU 30 using the authorization provided by the AAA server 10.

FIG. 2a is a flowchart illustrating the process in which the user (via STB 40) requests a channel to the ONU 30, and in turn, the ONU 30 requests the authorization to the AAA server 10 to perform the authentication. As shown, the STB 40 first requests a desired broadcasting service to the ONU 30 (step 201). Then, the ONU 30 requests the AAA server 10 whether the user has the authorization to access the corresponding service (step 202). At this time, the AAA server 10 performs the authentication, and transmits the result of authentication process to the ONU 30 as an authorization response (step 203). Thereafter, the ONU 30 provides the request service response according to the authentication result to the STB 40 (step 204).

FIG. 2b is a flowchart illustrating the process in which the user (e.g., STB 40) requests an authorization to the AAA server 10 directly and then requests a desired channel to the ONU 30 with the authentication approval. As shown, the STB 40 first requests whether it has the authorization to access the desired service by requesting an authorization to the AAA server 10. In response, the AAA server 10 performs the authentication, and transmits the authentication result to the STB 40 as an access response (step 206). Then, the STB 40 requests the broadcasting service according to the authorization result to the ONU 30 (step 207), and the ONU 30 provides the service to the STB 40 (step 208).

In order to obtain the broadcasting service from the ONU 30, the prior art requires to receive the authorization from the AAA server 10 or through the ONU 30. Accordingly, it takes longer for the STM 40 to request a channel and obtain the service using the prior art methods. Moreover, as the number of STBs 40 and services desired by the STBs 40 increase, the traffic between the ONU 30 and the AAA server 10 also increases to cause a more delay in obtaining the service. Furthermore, in the case that the AAA server 10 malfunctions or the ONU 30 and the AAA server 10 cannot communicate with each other, no service is provided to the STB 40.

SUMMARY OF THE INVENTION

Accordingly, the present invention has been made to overcome the above-mentioned problems and provides additional advantages, by providing a method of authenticating a channel authorization using a NAD (Network Access Device) in a combined broadcasting and communication system, so that an authorization process of a user without the aid of an AAA server.

One aspect of the present invention is to provide a method of authenticating a channel authorization using a NAD in a combined broadcasting and communication system, so that a service can be provide to a user promptly as the user request a channel change during the viewing.

Another aspect of the present invention is to provide a method of authenticating a channel authorization using a NAD in a combined broadcasting and communication system so that an AAA server only transmit a change in the service request to the NAD in response to the user's requests.

Yet another aspect of the present invention is to provide a method of authenticating a channel authorization using a NAD in a combined broadcasting and communication system which can improve the QoS (Quality of Service) for a user by enabling the NAD to process a channel authorization of a user even when a communication with the NAD is not feasible due to the malfunction of an AAA server.

Further aspect of the invention is to provide a method of authenticating a channel authorization using a NAD (Network Access Device) in a combined broadcasting and communication system, which includes a plurality of STBs (Set Top Boxes) for receiving a broadcasting, an OLT (Optical Line Terminal)/ONU (Optical Network Unit) for transferring a broadcasting stream to the STBs, and an AAA (Authentication, Authorization and Accounting) server for a channel authentication. The method includes a first step of preparing the NAD for determining whether to switch the broadcasting stream to the STBs in the ONU, a second step of initializing the NAD and storing authentication information of the channel authorization from the AAA server by booting the NAD, a third step of the NAD performing an authentication using the stored authentication information of the channel authorization in accordance with a channel request from the STB and switching the requested channel, and a fourth step of changing and storing the authentication information of the channel authorization in accordance with an update signal of the authentication information of the channel authorization from the AAA server.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, the method of authenticating a channel authorization using a NAD in a combined broadcasting and communication system according to preferred embodiments of the present invention will be described with reference to the accompanying drawings. For the purposes of clarity and simplicity, a detailed description of known functions and configurations incorporated herein will be omitted as it may make the subject matter of the present invention unclear.

To help understand the invention, the following definition are used:

The terms "ticket" and "class" signify means for defining a channel authentication information of a user. In particular, the term "ticket" represents an authorization assigned to a user and may be expressed by a class (or a channel authorization). The term "class" is a set of broadcasting channels classified according to the characteristic or the policy of a broadcasting channel. Thus, "ticket" is a set of classes assigned to a given user. For example, if a certain user group is expressed by a class, users in the user group corresponding to the class have the same authorization. Also, by giving different channel authorizations to the respective users, a specialized authorization can be given to each and every user. That is, by giving different channel tickets to respective users, it becomes possible for a specified user to use the channel to which a specified ticket is given.

Figure 1:
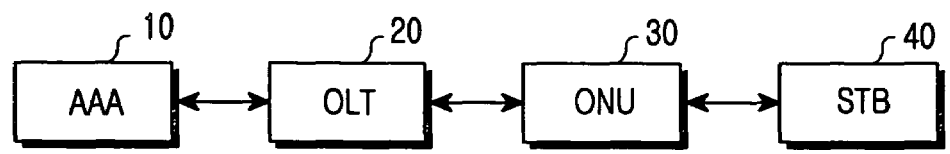
FIG. 1 is a block diagram illustrating an example of a general optical transmission network which provides a broadcasting service and a communication service.
Figure 2A:
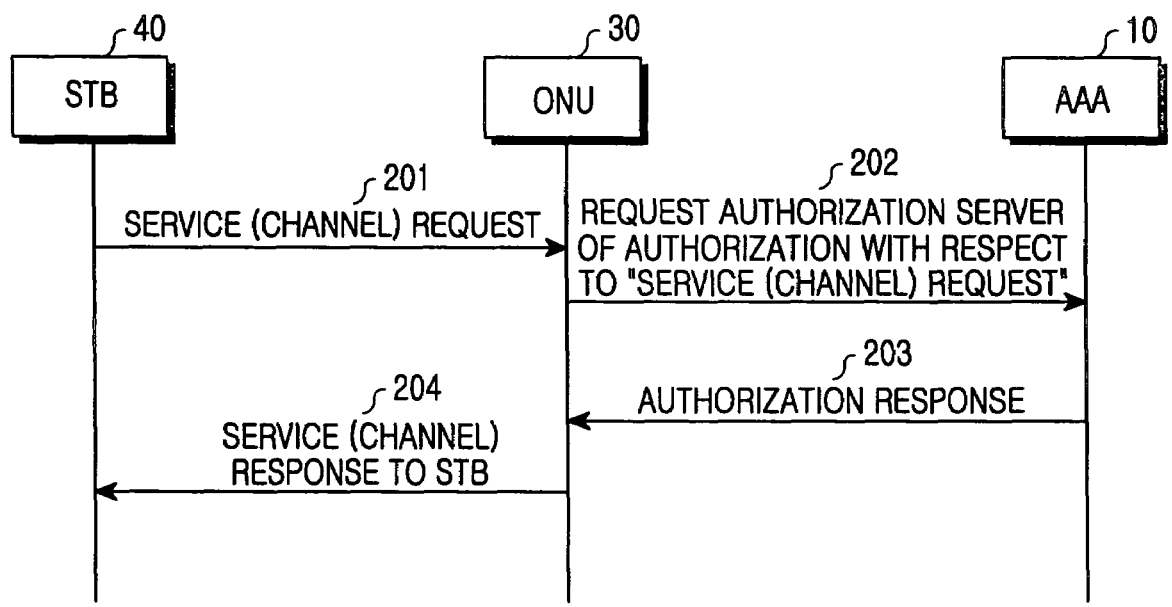
FIGS. 2a and 2b are flowcharts illustrating examples of an authentication process for the broadcasting service in the related art.
Figure 2B:
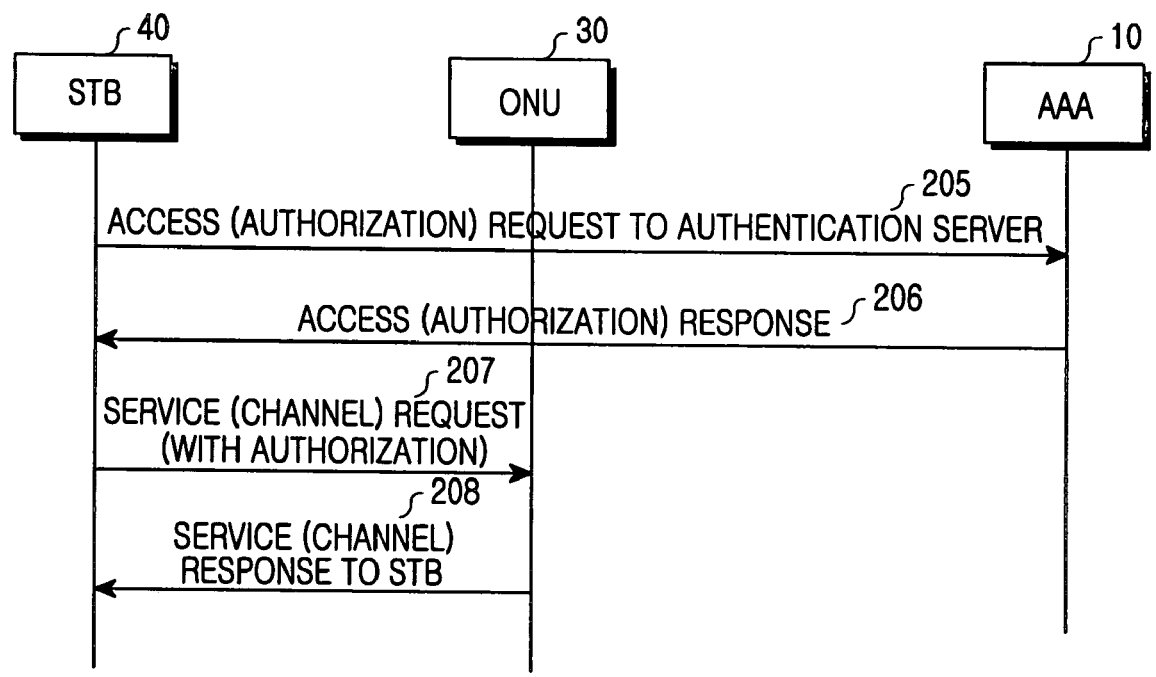
Figure 3:
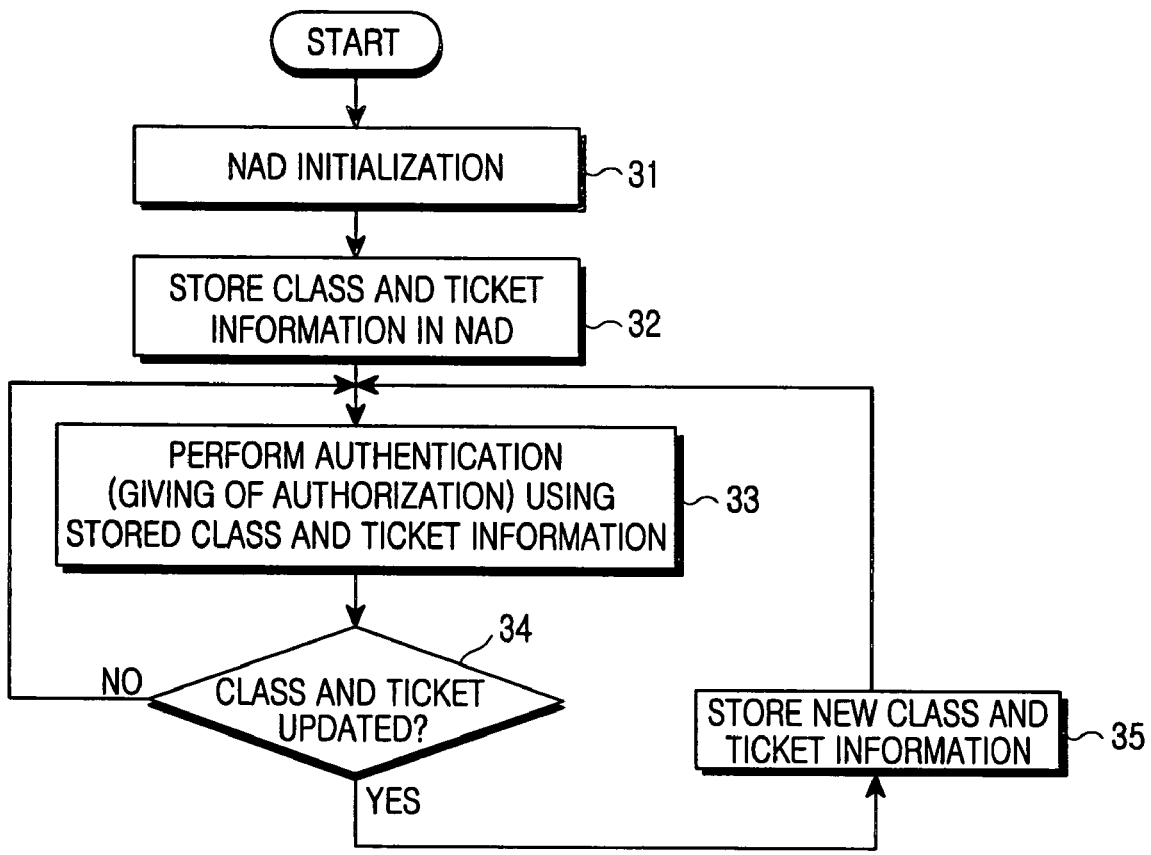
FIG. 3 is a flowchart illustrating a method of authenticating a channel authorization using a NAD in a combined broadcasting and communication system according to the present invention.

FIG. 3 is a flowchart illustrating a method of authenticating a channel authorization using a NAD (Network Access Device) in a combined broadcasting and communication system according to the present invention.

According to the inventive method, a NAD is provided in an ONU (Optical Network Unit), so that an authentication can be performed with the NAD without using an external AAA server 10. Hence, the NAD serves to determine whether to switch a broadcasting stream from an ONU 30 to an STB 40. That is, if the switching of the broadcasting stream is requested, the NAD determines whether to permit the requested switching or not.

The operation of the NAD is briefly divided into an initializing process, a processing process, and an updating process.

First, the NAD is initialized (step 31). In order to initialize the NAD, a class from the AAA server 10 and ticket information from the AAA server 10 are sent to the NAD and then stored in a RAM or NVM (Non-Volatile Memory) of the NAD (step 32). A service preparation can begin by loading the received information. This initializing process is performed only once during the booting of the NAD, and thus this does not affect the performance of the whole system.

Then, the authentication (e.g., giving the authorization) is performed using the stored class and ticket information (step 33). That is, with respect to a channel request from the STB 40, the NAD does not query to the AAA server 10, but determines the authorization of the STB 40 using the stored class and ticket information.

At this time, the NAD confirms whether the stored class and ticket information has been updated (step 34). If it is confirmed that the information is not updated, the NAD continuously performs the authentication using the stored class and ticket information (step 33). However, if it is confirmed that the stored class and ticket information has been updated, the NAD stores new class and ticket information (step 35), and performs the authentication using the new class and ticket information (step 33). In alternate embodiment, a periodic update occurs regardless of receiving a channel request from a STB user or when the information of the AAA server is changed. That is, the AAA server 10 periodically transmits the ticket information or the class to the NAD in order to update the stored class and ticket information, or transmits the new information to the NAD when one of the ticket information or the class has changed. Here, only the ticket or class information that has changed may be transmitted to reduce the data capacity.

Now, the method of authenticating a channel authorization using a NAD in a combined broadcasting and communication system according to the present invention will be explained in further details with reference to FIGS. 4 to 6.

Figure 4:
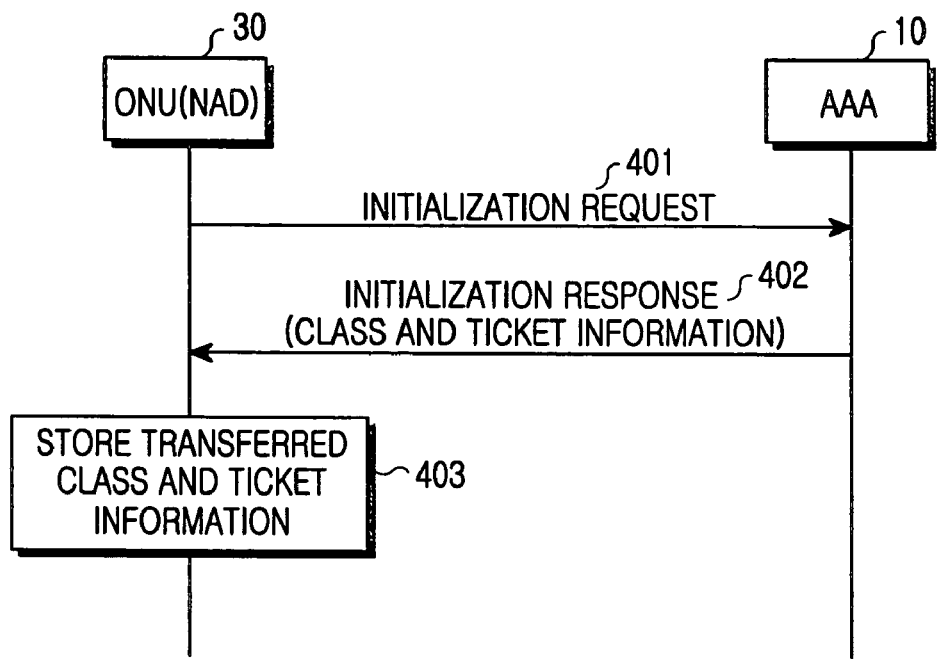
FIG. 4 is a flowchart illustrating a process of initializing a NAD in a method of authenticating a channel authorization using a NAD in a combined broadcasting and communication system according to the present invention.

FIG. 4 is a flowchart illustrating the process of initializing a NAD according to the present invention.

As shown, if the NAD of the ONU 30 is booted, the NAD requests the initialization to the AAA server (step 401), and in response, the AAA server 10 transmits the ticket information and/or the class to the NAD (step 402). Then, the NAD stores the transmitted ticket information and/or the class (step 403).

Figure 5:
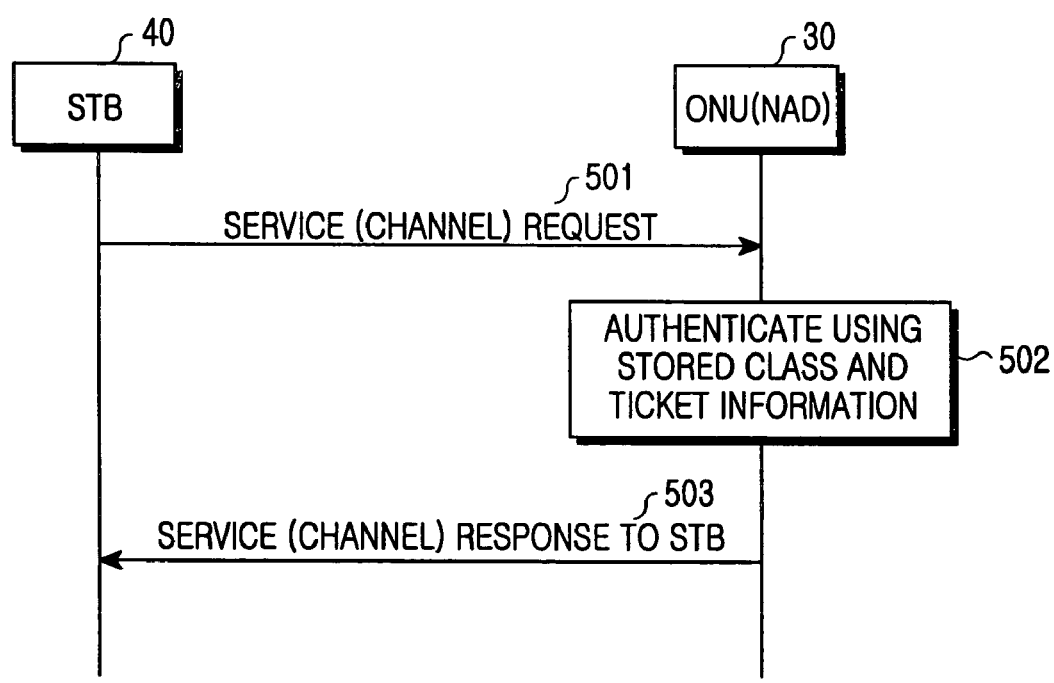
FIG. 5 is a flowchart illustrating an authentication process performed by a NAD in a method of authenticating a channel authorization using a NAD in a combined broadcasting and communication system according to the present invention.

FIG. 5 is a flowchart illustrating the authentication process performed by a NAD according to the present invention.

As shown, if the STB 40 requests for the service (e.g., channel) (step 501), the NAD determines whether to provide the service (channel) based on the stored class and the ticket information without connecting to the AAA server 10 (step 502). In response, the NAD responds to the service (channel) request from the STB 40 (step 503) if the STB 40 requested an authorized channel by providing the requested channel to the STB 40. If the STB 40 is not authorized, the NAD refuses the service.

A given service may expire after the authorized time period expires. As such, after switching, the NAD examines whether a user is watching an unauthorized broadcasting channel by monitoring the channel watched by the user at a predetermined interval. Alternatively, the NAD periodically checks to see whether to continue the service by checking whether the STB 40 still has the authorization.

Figure 6:
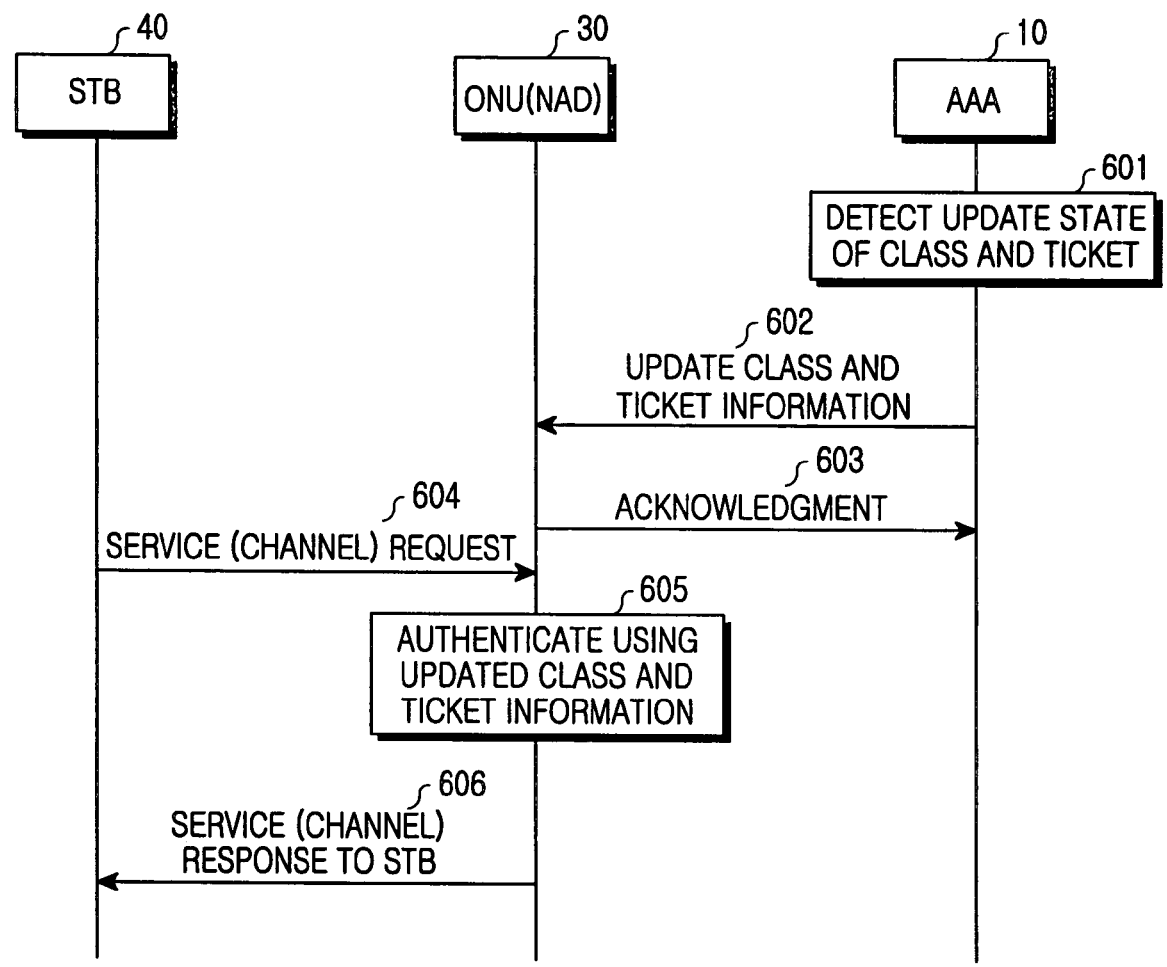
FIG. 6 is a flowchart illustrating a process of updating a NAD in a method of authenticating a channel authorization using a NAD in a combined broadcasting and communication system according to the present invention.

FIG. 6 is a flowchart illustrating the process of updating a NAD according to the present invention.

The values of the ticket information and the class are not permanent but may be changed according to a user's request or as occasion demands. In the prior art, since the AAA server 10 directly performs the authentication, an additional update was not required with respect to the subsequent information changes. However, according to the present invention, the authentication is performed using the ticket information and the class information stored during the initializing process, thus the update is desired to reflect any change. The update may be classified into two representative types: One is a periodic update performed by the AAA server 10, and the other is an update performed with respect to the changed contents only when the contents stored in the AAA server 10 are changed.

As shown in FIG. 6, if the AAA server 10 detects that the class and the ticket information requires an update (step 601), the update of the class and ticket information is performed in the NAD of the ONU 30 (step 602), and then the NAD of the ONU 30 transmits a message indicative of the completion of the update (step 603). Thereafter, subsequent operations steps are identical to that of FIG. 5. That is, if the STB 40 requests a service (e.g., channel) (step 604), the NAD determines whether to provide the service (e.g., channel) in accordance with the updated class and ticket information without connecting to the AAA server 40 (step 605). Then, the NAD provides the service (e.g., channel) to the STB 40 after the authentication process. That is, if the STB 40 has requested an authorized channel, the NAD switches the channel to the STB, and otherwise, it does not switch the channel to the STB. Note that if the available service of a user has expired based on the updated information, the NAD determines whether to continue the providing of the service by checking whether the STB has the authorization with respect to the service.

In the event there is a frequent and periodic update in the prior art, the provision of the service may be interrupted when the class and the ticket information are changed during an update period. In addition, since the whole information must be transmitted during the update operation, the load of the system may become deteriorated. However, in the preferred embodiment of the present invention, the NAD update is considered to be the update of the changed contents when the AAA server 10 detects the change, thus overcoming the prior art problems.

As described above, the method according to the present invention can process the authorization of the user separately from the AAA server with respect to user's request such as a channel change that frequently occurs in the broadcasting service, and thus it can provide the service promptly, without an undesirable delay, to the user. Also, the method according to the present invention can reduce the load of the system by making the AAA server transmit the changed ticket information and the class to the NAD only when the authorization of the user is changed. Moreover, the method according to the present invention can enable the NAD even when a communication with the NAD is down due to the malfunction in the AAA server. Furthermore, the method according to the present invention can make an operator give the authorization according to the users and channels, and thus diverse types of service models can be proposed. It should be noted that the method according to the present invention can be implemented by programs and can be stored in recording media such as CD ROM, RAM, floppy disc, hard disc, optomagnetic disc, etc., in a computer-readable form.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of authenticating a channel authorization using a NAD (Network Access Device) in a combined broadcasting and communication system having a plurality of STBs (Set Top Boxes) for receiving a broadcasting, an OLT (Optical Line Terminal)/ONU (Optical Network Unit) for transferring a broadcasting stream to the STBs, and an AAA (Authentication, Authorization and Accounting) server for a channel authentication, the method comprising:
   a first step of providing the NAD in the ONU to determine whether to switch the broadcasting stream to the STBs;
   a second step of initializing the NAD by receiving and storing authentication information of the channel authorization from the AAA server;
   a third step of the NAD performing an authentication using the stored authentication information in response to a channel request from the STB and switching to the requested channel after the authentication; and
   a fourth step of changing and storing the authentication information of the channel authorization in response to an update signal from the AAA server.

2. The method of claim 1, wherein the second step comprises:
   transmitting an initialization request to the AAA server by booting the NAD;
   receiving the authentication information of the channel authorization from the AAA server in response to the initialization request; and
   storing the received authentication information of the channel authorization.

3. The method of claim 1, wherein the third step comprises:
   a fifth step of the NAD performing the authentication of the STB with respect to the requested channel using the stored authentication information of the channel authorization in response to the channel request from the STB; and
   a sixth step of, if the channel requested by the STB is a channel of which the STB has the authorization, switching the corresponding authorized channel to the STB.

4. The method of claim 3, wherein the third step further comprises:
   confirming by the NAD whether the STB uses the requested channel at predetermined intervals; and if so, determining whether to continue the providing the service with respect to the requested channel based on the stored authentication information of the channel authorization.

5. The method of claim 1, wherein the fourth step comprises:

a fifth step of, if the authentication information of the channel authorization update is detected, the NAD receiving update information of the authentication information of the channel authorization from the AAA server;

a sixth step of the NAD confirming the completion of the update by transferring a confirmation message to the AAA server; and a seventh step of replacing the authentication information of the channel authorization stored at the second step with the update information.

6. The method of claim 5, wherein the fifth step occurs when the AAA server detects a change of the authentication information of the channel authorization.

7. The method of claim 5, wherein the fifth step occurs when the AAA server detects an expiration of a predetermined update period.

8. The method of claim 1, wherein the authentication information of the channel authorization includes a class indicative of a set of authorized channels in a broadcasting service, and a ticket indicative of an authorization given to a user.

* * * * *